United States Patent [19]
Brown

[11] Patent Number: 5,395,425
[45] Date of Patent: Mar. 7, 1995

[54] APPARATUS EMPLOYING POROUS DIAPHRAGMS FOR PRODUCING USEFUL WORK

[76] Inventor: Melvin H. Brown, 1837 Shadyside Rd., Lakewood, N.Y. 14750-9646

[21] Appl. No.: 163,834

[22] Filed: Dec. 7, 1993

Related U.S. Application Data

[63] Continuation-in-part of Ser. No. 991,216, Dec. 15, 1992, Pat. No. 5,316,568.

[51] Int. Cl.⁶ ............................................ B01D 53/22
[52] U.S. Cl. ................................. 95/31; 95/45; 95/55
[58] Field of Search ................ 55/465, 525; 95/31, 95/32, 39, 43, 45, 52, 55; 96/4; 417/572

[56] References Cited

U.S. PATENT DOCUMENTS

| | | |
|---|---|---|
| 2,158,238 | 5/1939 | Hvid ............................ 55/209 X |
| 2,584,785 | 2/1952 | Bowman et al. ................... 95/43 |
| 2,585,244 | 2/1952 | Hanson ........................ 55/209 X |
| 2,609,059 | 9/1952 | Benedict ........................... 95/55 |
| 2,650,670 | 9/1953 | Cichelli ............................ 95/43 |
| 2,688,404 | 9/1954 | Wahl ........................... 55/209 X |
| 3,208,197 | 9/1965 | Simon et al. ...................... 95/45 |
| 3,677,844 | 7/1972 | Fleischer et al. ............... 96/108 X |
| 3,713,921 | 1/1973 | Fleischer et al. ............... 96/108 X |
| 3,725,271 | 4/1973 | Giannotti . |
| 3,777,809 | 12/1973 | Milde, Jr. ...................... 96/4 X |
| 3,811,999 | 5/1974 | Fleischer et al. . |
| 3,813,856 | 6/1974 | Jensen . |
| 3,973,928 | 8/1976 | Nierenberg et al. ............... 95/48 |
| 4,135,898 | 1/1979 | Rosengard ..................... 95/34 X |
| 4,147,480 | 4/1979 | Deutsch ......................... 417/572 |
| 4,147,481 | 4/1979 | Deutsch ......................... 417/572 |
| 4,280,909 | 7/1981 | Deutsch ...................... 417/572 X |
| 4,284,418 | 8/1981 | Andres ............................ 95/32 |
| 4,373,941 | 2/1983 | Lagelbauer .................... 95/35 X |
| 4,466,811 | 8/1984 | Johnson, III ..................... 95/31 |
| 4,718,921 | 1/1988 | Makino et al. .................... 95/52 |
| 4,813,851 | 3/1989 | Chun et al. .................. 417/572 X |
| 5,145,493 | 9/1992 | Nguyen et al. .................... 95/31 |
| 5,204,003 | 4/1993 | Cochran, Jr. .................. 95/48 X |
| 5,316,568 | 5/1994 | Brown ............................. 95/31 |

FOREIGN PATENT DOCUMENTS

| | | |
|---|---|---|
| 1020960 | 12/1957 | Germany . |
| 2413990 | 9/1974 | Germany . |
| 2900689 | 7/1980 | Germany . |

*Primary Examiner*—Robert Spitzer

[57] ABSTRACT

Membranes having a multiplicity of openings therethrough which are sized and shaped to utilize the random motion of molecules of gas to produce gas flow through the membrane predominantly in one direction. Such membranes can be used in power systems, gas separation systems and other systems which utilize fluid flow.

17 Claims, 3 Drawing Sheets

APPARATUS EMPLOYING POROUS DIAPHRAGMS FOR PRODUCING USEFUL WORK

CROSS REFERENCE RELATED APPLICATION

This application is a continuation-in-part of U.S. application Ser. No. 07/991,216, filed Dec. 15, 1992, now U.S. Pat. No. 5,316,568, which issued on May 31, 1994, the subject matter of which is fully incorporated herein by reference.

FIELD OF THE INVENTION

The present invention relates to a method and apparatus for producing fluid flow and in particular to membranes or wall structures having openings extending therethrough sized and shaped to utilize the random motion of atoms or molecules in gases to move gases through the membranes predominantly in one direction. The invention employs this phenomenon to separate fast moving from slow moving molecules and provides means responsive to a temperature differential existing between such fast and slow moving molecules to carry out work producing processes such as the production of power, heating, cooling, refrigeration, etc.

BACKGROUND OF THE INVENTION

It is well known to produce fluid flow by various mechanical devices such as fans and pumps. It is also well known that fluid flow can be produced by causing temperature or pressure changes in a fluid as by heating a fluid or gas to cause circulation of the fluid or circulation of the vapors created by the heating process. Heating of air and water by the sun for example produces fluid flow in the atmosphere and bodies of water. Most systems for producing fluid flow require the application of external energy or power such as electricity, heat, animal power, or other energy sources. It is also known that fluids can be moved through a porous membrane by osmosis, which requires no external energy, and by reverse osmosis which requires the application of pressure.

It is also known that gases consist of large numbers of molecules that are in continuous random motion. As used herein, the term "molecule" designates that smallest particle of any gas, which with some gases consists of combined atoms or in other gases uncombined atoms. The continuous random motion of the molecules of gas results in many collisions of the molecules. These collisions occur quite frequently for a gas at atmospheric pressure, about $3 \times 10^9$/sec. for each molecule of air. Because of these collisions, the direction of motion of a gas molecule is constantly changing. The diffusion of a molecule from one point to another consists of many short, straight-line segments as collisions buffet them around in random directions. Diffusion is faster for light molecules than for heavy ones. The average distance traveled by a molecule between collisions is known as the "mean free path". The higher the density of a gas, the smaller the mean free path. This means that the more molecules there are in a given volume, the shorter the average distance traveled between collisions. The term "diffusion" refers to the spread of a substance through a space or through a second substance. For example, the molecules of a perfume diffuse throughout a room.

The rate at which a gas is able to escape through a tiny hole depends on the molecular mass of the gas. The process of escape is known as "effusion".

As indicated above, it is known that lighter atoms or molecules of gas have a higher average speed than heavier molecules. Thus, it is known that atoms or molecules of a lighter gas, moving at a higher average speed than a heavier gas, will pass through a hole more rapidly than will molecules of the heavier gas. This phenomenon has been used to separate gases of different weights by passing such gases through porous barriers or membranes, see *Perry's Chemical Engineering Handbook*, 4th ed., sec. 21, pp. 4 to 5.

The average velocities of the molecules of two gases of a mixture of the two gases are inversely proportional to the square root of their molecular weights. When the mixture is allowed to diffuse through a porous barrier into a low pressure space, the gas which has passed through the barrier is enriched in the lightest weight constituent. Separation efficiency can be improved by using many stages in a cascade. It is necessary that the flow through the barrier be by true diffusion and not by mass flow which requires that the pore diameters be on an order of magnitude of the mean free path of the molecules, or about $7 \times 10^{-6}$ cm for air at atmospheric pressure. Since the mean free path is inversely proportional to the gas pressure, larger diameter pores can be used by operating at reduced pressure.

Membranes with tapered pores having diameters on the order of the mean free path are also capable of separating gases with different molecular weights. The faster moving lower molecular weight molecules move through the pores at a faster rate than the slower moving higher molecular weight molecules. Since membranes with small tapered pores utilize the random motion of molecules to move the gas through the membranes from the small ends of the pores to the large ends, as discussed in the above parent application, the pressure on the downstream side is higher than the upstream side. Thus, recycling can be obtained by simply using bypass lines across the membranes, thereby eliminating the need for a compressor operating across each membrane in a cascade.

There are many uses for apparatus that cause fluid flow including heating and cooling systems, power generation systems and fluid transfer systems, among others.

There is a need for a system for causing fluid flow that uses little or no external energy to thereby minimize the cost of producing the fluid flow and the generation of useful work provided by such fluid flow.

SUMMARY OF THE INVENTION

The present invention utilizes multiple membranes of the above parent application to separate fast and slow moving molecules and utilizing the heat of condensation of condensable gases to produce mechanical power, heating or cooling. This is effected by apparatus that is responsive to a temperature differential obtained by condensation and evaporation of a condensable phase of the mixture of molecules and gases. Details of two embodiments of such apparatus are discussed below. Also, differences in temperatures obtained by separating fast (hot) molecules from slow (cold) molecules can also be used to produce mechanical power, heating or cooling.

BRIEF DESCRIPTION OF THE DRAWINGS

The objectives and advantages of the invention will be better understood from consideration of the following description and the accompanying drawings in which.

DETAILED DESCRIPTION OF THE PREFERRED EMBODIMENTS

Figure 1:
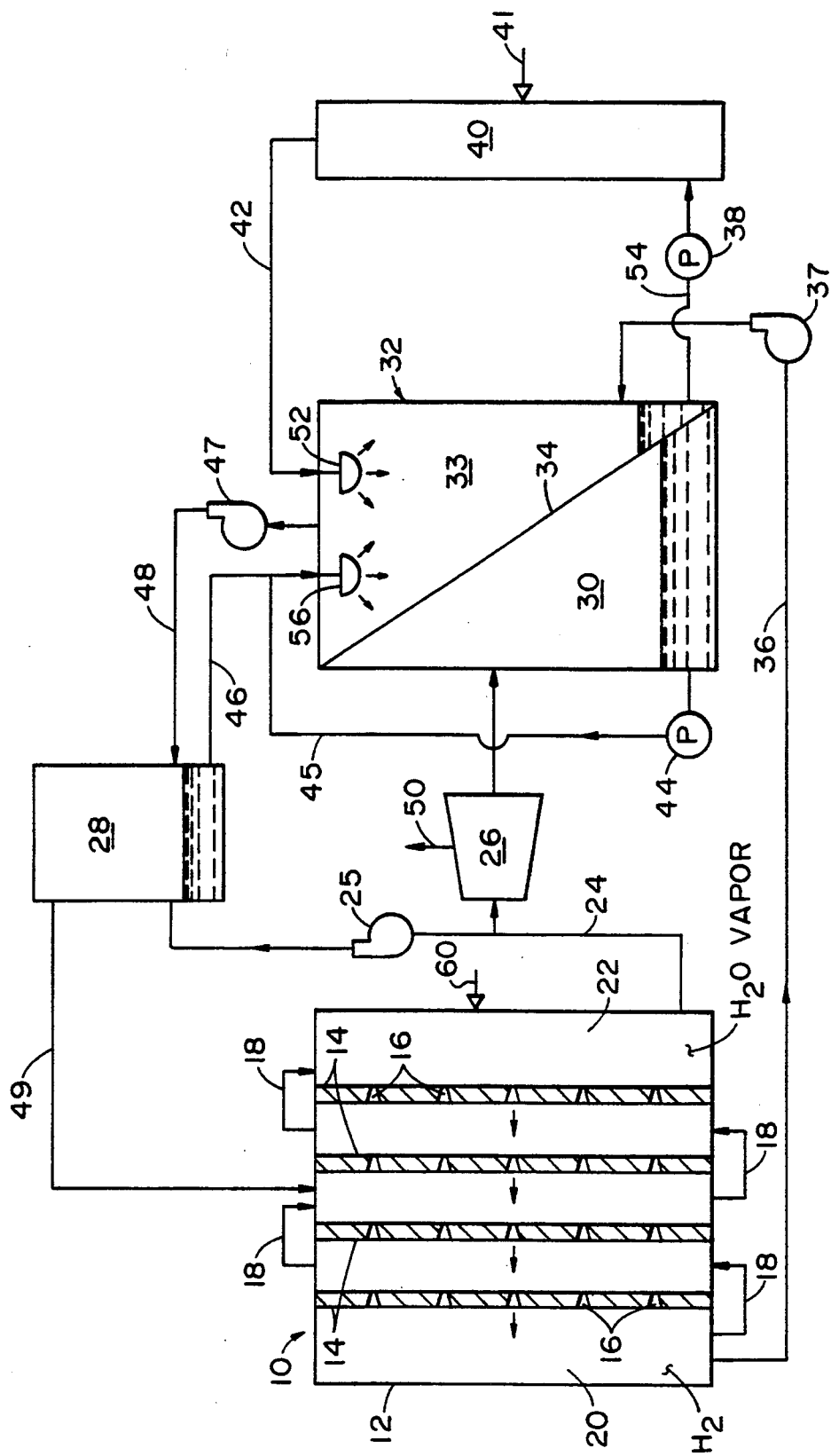
FIG. 1 is a schematic representation showing the separation of water vapor from hydrogen to produce mechanical power.

Referring now to FIG. 1 of the drawings, a system 10 is shown for separating water vapor from hydrogen contained in a chamber 12. Four perforated membranes 14 are shown provided in chamber 12, with tapered pores 16 having diameters on the order of the mean-free path of the gas ($H_2$) to be moved, namely, about $1.5 \times 10^{-4}$ cm. Gas movement through the membrane creates high pressure and low pressure on sides 20 and 22, respectively, in chamber 12. The number of membranes is given by way of example only.

Bypass conduits, pipes or tubes 18 are shown connected across each membrane to recycle a portion of the gas mixture (hydrogen and water vapor) from the higher pressure side 20 of chamber 12 to the lower pressure side 22. By control of the diameter of 18 or by use of valves (not shown) prevents equalization of the pressures in 20 and 22.

The sizes of pores 16 in membranes 14, as discussed above, are such that the lighter and faster moving hydrogen molecules move through the pores from the smaller to the larger ends at a faster rate than the slower and heavier water vapor molecules, thereby separating the hydrogen from the water vapor. This locates the water vapor primarily in the low pressure portion 22 of membrane chamber 12.

A conduit, pipe or tube 24 connects chamber portion 22 to a turbine 26 and to a mixing chamber 28. A blower 25 is shown connected between 24 and 28. The turbine, in addition is exhausted to a condenser 30 which is shown in FIG. 1 as occupying one half of a vessel 32. The other half is a cooling chamber 33, the two halves of 32 being divided by heat transfer partition 34.

A conduit 36 and blower 37 in FIG. 1 connect the high pressure, hydrogen side of chamber 12 to the lower portion of cooling chamber 33. Also connected to the lower portion of the cooling chamber is a pump 38 that transfers liquid water from the cooling chamber to a heat exchanger 40, where heat is absorbed at 41 from a suitable external source such as warm ambient air, river, lake or ocean water, solar sources or other sources of heat (not shown). A conduit 42 connects the upper portion of exchanger 40 to the upper portion of cooling chamber 33, while a pump 44 and conduit 45 connect the lower portion of condenser 30 to the upper portion of the cooling chamber. A conduit 46 feeds condensate from mixing chamber 28 to the upper portion of cooling chamber 33.

A blower 47 and conduit 48 connect the upper portion of cooling chamber 33 to a lower portion of mixing chamber 28 while the upper portion of chamber 28 is connected to membrane chamber 12 via a conduit 49.

The system of 10 operates in the following manner. The lighter and faster moving hydrogen molecules in membrane chamber 12 move through pores 16 to the high pressure portion 20 of chamber 12, leaving water vapor, at a pressure of about 66 mm Hg and a temperature of about 43° C., in chamber portion 22. The water vapor is then directed to turbine 26 which operates with the above inlet pressure of chamber portion 22 and an outlet pressure of 13 mm Hg. The turbine produces work at 50 extracted from the reduction in pressure in the turbine, which occurs because a pressure drop due to condensation transfer in a condenser 30 that receives water vapor from the turbine.

Hence, low pressure water vapor (13 mm Hg) from the turbine exhausts to condenser 30, as shown. The water condenses in the condenser at a temperature of about 15° C. and pressure $\approx 13$ mm Hg. The heat of condensation in 30 passes through partition 34 in vessel 32 to the cooling section 33. The material of 34 is preferably aluminum or copper, which metals provide good heat transfer.

The higher pressure hydrogen in chamber portion 20 of membrane chamber 12 is directed to the lower portion of cooling section 33 by conduit 36 and blower 37. The hydrogen contacts liquid water entering at the top of 33 from heat exchanger 40 via a spray device 52 located in the upper portion of cooling section 33. The liquid water enters 33 at a temperature of about 15° C. Liquid water in exchanger 40 is received there from the bottom of 33 via pump 38 and connecting conduits 54, the pump providing pressure in 40 that is effective to direct water to 52 via conduit 42. With hydrogen entering 33 from membrane chamber 12 and liquid water entering 33 from 40, evaporation of the liquid water takes place in 33 to form a mixture of hydrogen gas ($H_2$) and water vapor ($H_2O$). Evaporation of liquid water in 33 lowers the temperature of the liquid water in 33 and increases the amount of water vapor in the mixture. The liquid water enters heat exchanger 40 from 33 at a temperature of about 10° C. where the water receives heat from a source such as warm external air or water (river, lake, ocean) solar energy, etc., as discussed earlier. The liquid water from 40 enters 33 in spray form (by device 52) at a temperature of about 15° C.

The hydrogen-water vapor mixture in cooling chamber 33, with a temperature $\approx 15°$ C. and pressure $\approx 66$ mm Hg, is directed through conduit 48 (by blower 47) to mixing vessel 28 where the hydrogen-water vapor mixture contacts a portion of the water vapor from membrane chamber 12; the water vapor in section 22 of 12 is sent to vessel 28 by blower 25. The water vapor condenses in 28 and thereby increases the temperature of the mixture in 28 so that condensing of the vapor in membrane chamber 12 does not occur, with the temperature being higher in 28 than in 12. Additional heat at 60 may be needed to prevent condensation in 12 that might clog pores 16 in 12.

Conduit 49 conducts the mixture in 28 to chamber 12 under force of gravity.

Conduit 45 carries liquid water at a temperature $\approx 15°$ C., as pumped by pump 44, from condenser section 30, to cooling section 33 via a spray device 56 in the upper portion of 33. Liquid water from mixing chamber 28 is also directed under force of gravity to spray device 56 by a conduit 46. Evaporation in 33 cools the water in 33.

Other mixtures of light and heavy molecules can be used to produce work in the manner of FIG. 1. Also, light condensable molecules can be used with heavy non-condensable molecules. In such a case, the gas mixture passing through the membranes would be enriched with the condensable vapor.

In addition, combinations of pressures and temperatures other than the ones discussed above in connection with FIG. 1 can be used.

Figure 2:
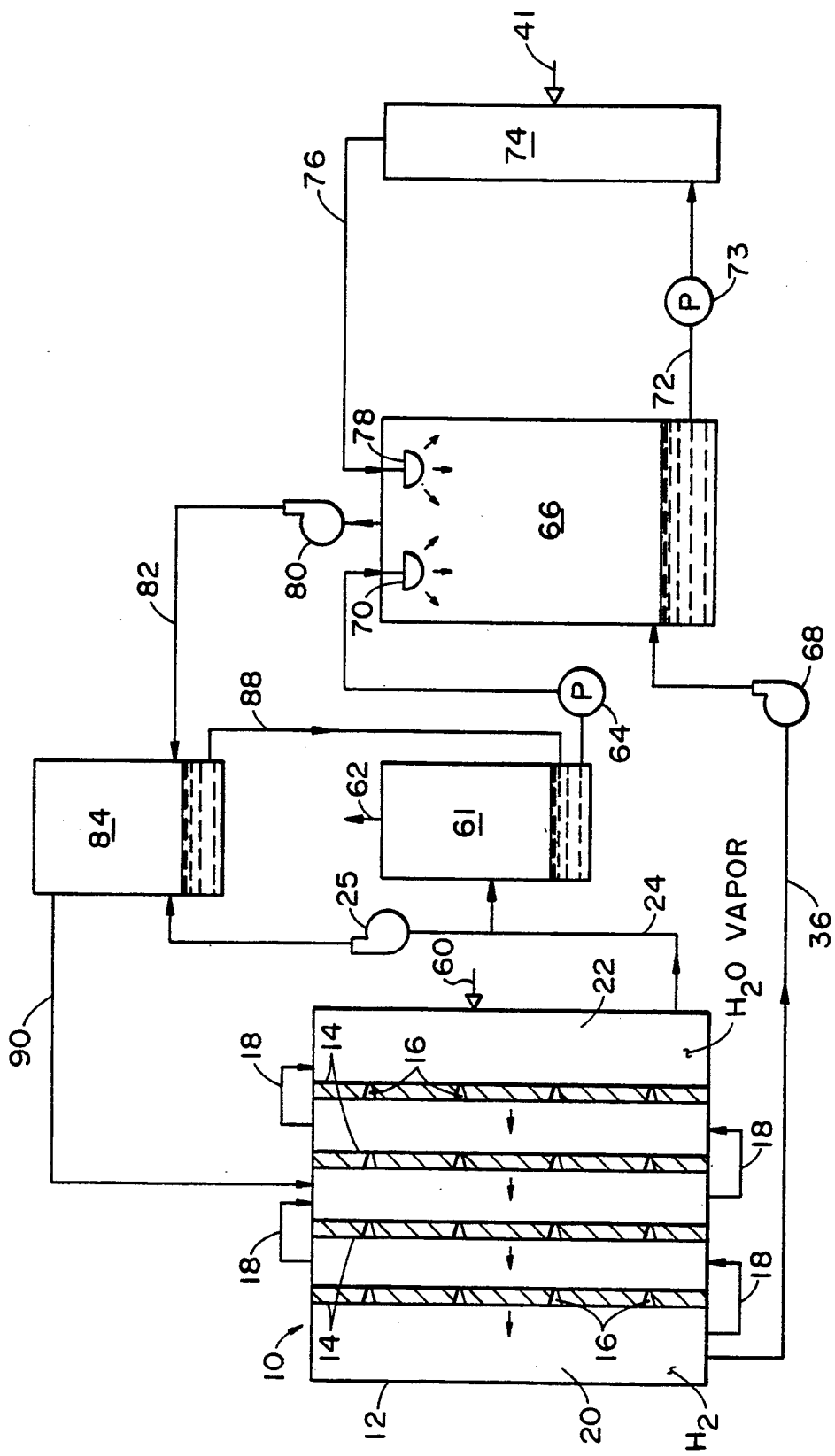
FIG. 2 is a schematic representation showing the use of a temperature differential between fast and slow moving molecules that can be used for space heating or cooling as well as power production.

FIG. 2 of the drawings shows an apparatus 10 constructed to produce a temperature differential capable of power generation and space heating or cooling. Apparatus 10 has certain components that are the same as those of the system depicted of FIG. 1, which components bear the same reference numerals in FIG. 2 as in FIG. 1.

As shown in FIG. 2, a membrane separator and chamber 12 again contains four membranes 14 having pores 16, the diameters of which are on the order of the mean free path of the gas (hydrogen) to be moved through the pores, which is about $1.5 \times 10^{-4}$ cm. Pores 16 are (again) tapered, and the gas moves from the small diameter ends to the large diameter ends. The lighter faster molecules move through the pores at a faster rate than the water molecules resulting in separation of the hydrogen and water vapor. Water vapor from low pressure section 22 of membrane chamber 12 is carried by conduit 24 to a condenser 61 at a pressure of about 66 mm Hg and a temperature of about 43° C. The water vapor in 61 gives up heat of condensation at the above pressure and temperature. Heat is rejected from the condenser at 62. The liquid water in the bottom of 61 is condensate from the vapor in 61. Liquid water collects in the bottom of 61 and is pumped from 61 by pump 64 at the temperature (43° C.) of the above water vapor. Pump 64 directs the water from 61 to the upper portion of a cooling chamber 66, which chamber operates at a pressure of about 66 mm Hg and a temperature of about 10° C. Hydrogen gas from the high pressure side 20 of chamber 12 is directed to the lower portion of the cooling chamber by a blower 68. The liquid water from 61 is sprayed into the cooling chamber by a device 70, the hydrogen from 20 coming in contact with the liquid water. Evaporation of the water lowers the water temperature and increases the amount of water vapor in 66 in a mixture of the hydrogen and vapor in the cooling chamber.

From chamber 66, liquid water at about 10° C. is pumped by pump 73 through a conduit 72 to a heat exchanger 74 where heat is absorbed from a heat source 41, as described above in connection with heat exchanger 40 in FIG. 1. From 74, liquid water is carried to the top of the cooling chamber by a conduit 76 at a temperature of about 15° C. and sprayed into the chamber by a spray device 78. Pump 73 provides pressure in 74 that moves the water to 78.

The hydrogen-water vapor mixture in cooling chamber 66 has a pressure of $\approx 66$ mm Hg and a temperature $\approx 10°$ C. and is comprised of about nine volumes of $H_2$ and one volume of $H_2O$. A blower 80 and conduit 82 direct this mixture to a mixing chamber 84 where the mixture contacts a portion of the water vapor from the low pressure side 22 of membrane chamber 12. As in FIG. 1, water vapor is carried by conduit 24 and a blower 25 to the mixing chamber from 22. The contact of water vapor from 22 with the mixture in chamber 84 condenses the water vapor which increases the temperature of the mixture so that condensation of water vapor in 12 does not occur in chamber 12. Additional heat 60 may be needed to prevent condensation in chamber 12 that might clog pores 16.

Liquid water in the bottom of mixing chamber 84 is directed under force of gravity to condenser 61 via a conduit 88 at a temperature $\approx 43°$ C.

A conduit 90 directs the hydrogen-water vapor mixture in mixing chamber 84 to membrane chamber 12 at a pressure $\approx 66$ mm Hg and a temperature of about 43° C. under force of gravity.

Other mixtures of light and heavy molecules can be used in the manner described above in connection with FIG. 2. Also, light condensable molecules, in this case the gas mixture passing through the membranes, would be enriched with the condensable vapor. Combinations of pressures and temperatures other than the ones illustrated can also be used.

Calculated velocities for oxygen at °C. according to Maxwell's law of the distribution of velocities are shown as follows:

| Velocity Interval Meters per Second (1) | Number of Particles (1) | Temperature °C. (2) |
| --- | --- | --- |
| Below 100 | 1.4 | Below −260 |
| 100 to 200 | 8.1 | −260 to −222 |
| 200 to 300 | 16.7 | −222 to −157 |
| 300 to 400 | 21.5 | −157 to −68 |
| 400 to 500 | 20.3 | −68 to 48 |
| 500 to 600 | 15.1 | 48 to 189 |
| 600 to 700 | 9.2 | 189 to 356 |
| Above 700 | 7.7 | Above 356 |

(1) Fundamentals of Physical Chemistry, Euchen, Jette and Lamer, 1st ed. 2nd impression, p. 70, McGraw-Hill 1925
(2) The temperatures were calculated from the equation:

$$T = \frac{MU^2}{3R} - 273$$

M = molecular weight
U = velocity centimeters per second
R = $8.315 \times 10^7$ ergs per degree
Outlines of Theoretical Chemistry, Getman and Daniels, 6th ed. p. 338, John Wiley and Sons If a gas is in contact with a membrane having small tapered pores, with diameters on the order of the mean free path or less of the gas, the gas molecules should move through the pores, molecule by molecule, with little or no interference from other molecules. The fast moving or hot molecules should move from the small end of the pores to the large ends at a faster rate than the slow moving or cold molecules, so that the gas on the downstream side of the membrane would be at a higher temperature than the upstream side.

Figure 3:
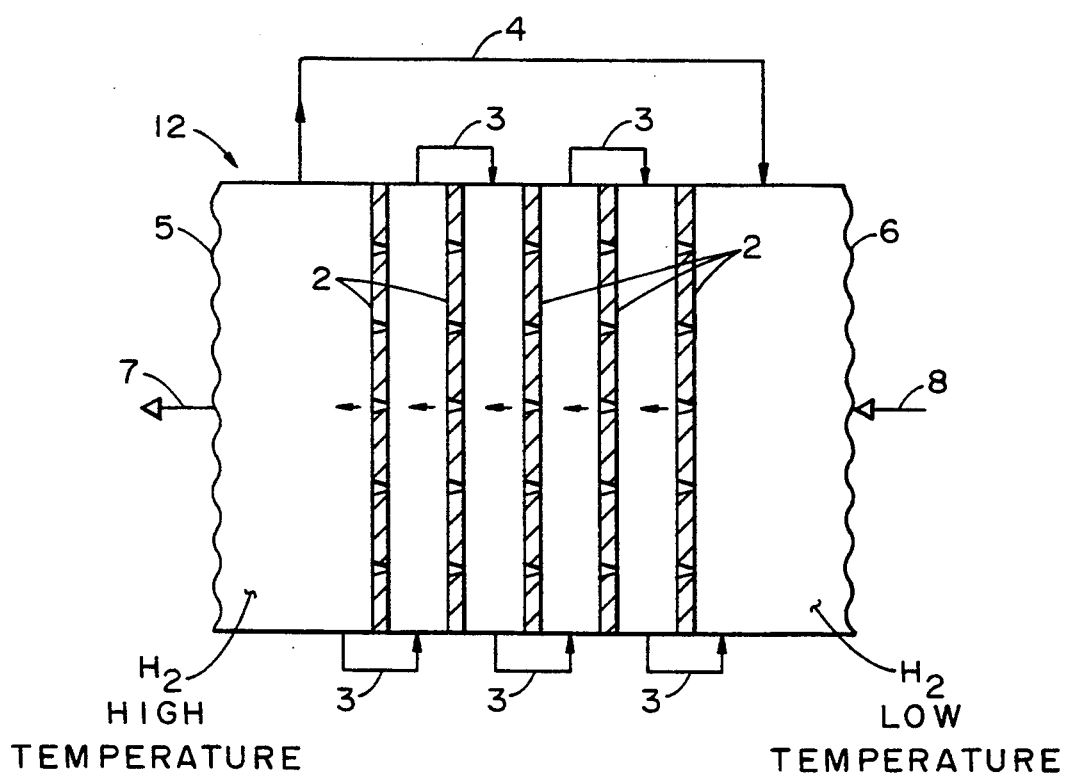
FIG. 3 schematically represents a membrane chamber for separating fast moving hot molecules from slow moving cold molecules.

A system for separating fast moving hot molecules from slow moving cold molecules is illustrated in FIG. 3. A separator 12 (using the same numeral in FIGS. 1 and 2) contains five membranes 2 with pore diameters in the order of the magnitude of the mean free path of hydrogen at 10 mm Hg (about 0.001 cm). The pores are tapered and the molecules move from the small ends to the large ends of the pores. The fast moving hot molecules move through the pores at a faster rate than the slow moving cold molecules resulting in separation of the hot and cold molecules. Bypass lines 3 across each membrane are again used to recycle a portion of the hydrogen from the higher pressure downstream side to the lower pressure upstream side. Line 4 recycles hydrogen from the high temperature side of the separator to the low temperature side to reduce pressure in the high temperature side so that molecules continue to move through the membranes. Heat 7 is rejected or transferred from the hot side of the separation chamber through a heat transfer surface 5. Heat 8 is absorbed by the cold side of the membrane chamber through a heat transfer surface 6.

Gases other than hydrogen, as well as mixtures of gases, can be employed in the scheme of FIG. 3. Various combinations of operating pressures and pore diameters can also be used. The apparatus illustrated in FIG. 3 can be employed for space heating or cooling and refrigeration. Also, the temperature difference between the hot and cold surfaces of the chamber 12 can be used for the production of power.

What is claimed is:

1. A method suitable for generating power by separating condensible and non-condensible gases of different molecular weights comprising:
   (a) providing at least one porous membrane with small pores extending therethrough of a size and shape to utilize random motion of molecules in a gas to move gas through the membrane predominantly in one direction;
   (b) condensing the condensible gases to produce heat of condensation; and
   (c) producing power by means responsive to said heat of condensation.

2. The method in accordance with claim 1 wherein the minimum cross-sectional dimension of said pores is of the same order of magnitude as the mean free path of the gases moved.

3. A method suitable for producing heating and/or cooling by separating condensible and non-condensible gases of different molecular weights comprising:
   (a) providing at least one membrane with pores extending therethrough of a size and shape to utilize random motion of molecules in a gas to move gas through the wall predominantly in one direction;
   (b) condensing the condensible gases to produce heat of condensation; and
   (c) producing heating and/or cooling by means responsive to said heat of condensation.

4. The method in accordance with claim 3 wherein the minimum cross-sectional extent of said pores is of the same order of magnitude as the mean free path of the gases moved.

5. A method suitable for generating power by separating fast-moving molecules from slow-moving molecules in a gas comprising:
   (a) providing at least one membrane having pores extending therethrough of a size and shape to utilize random motion of molecules in a gas to move gas through the membrane predominantly in one direction;
   said fast-moving and slow-moving molecules providing a temperature difference between the fast-moving and slow-moving molecules; and
   (b) producing power by means responsive to the temperature difference between said fast-moving molecules and slow-moving molecules.

6. The method in accordance with claim 5 wherein the minimum cross-sectional extent of said pores is of the same order of magnitude as the mean free path of the gas moved.

7. A method for producing heating and/or cooling by separating fast-moving molecules from slow-moving molecules in a gas comprising:
   (a) providing at least one membrane having pores extending therethrough of a size and shape to utilize random motion of molecules in a gas to move gas through the wall predominantly in one direction;
   the fast-moving and slow-moving molecules providing a temperature difference between the fast-moving and slow-moving molecules; and
   (b) producing heating and/or cooling by means responsive to the temperature difference between the fast-moving molecules and slow-moving molecules.

8. The method in accordance with claim 7 wherein the minimum cross-sectional extent of said pores is of the same order of magnitude as the mean free path of the gas moved.

9. A method suitable for separating gases of different molecular weights comprising:
   (a) providing a plurality of membranes having pores extending therethrough of a size and shape to utilize the random motion of molecules in a gas to move gas through the membranes predominantly in one direction and with higher pressure on the downstream sides than on the upstream sides;
   (b) arranging the membranes in series with a by-pass around all or most of the membranes to recycle a portion of the gas from the downstream sides to the upstream sides of the membranes such that the gas is enriched with lower molecular weight molecules from the downstream sides of the plurality of membranes, while the gas is enriched with higher molecular weight molecules from the upstream side of the plurality of membranes;
   (c) introducing a gas mixture at a point between first and last membranes of the plurality; and
   (d) removing the gas enriched with lower molecular weight molecules from the downstream sides of the plurality of membranes and the gas enriched with higher molecular weight molecules from the upstream sides of the plurality.

10. The method in accordance with claim 9 wherein:
    (a) the gases contain condensible and non-condensible gases of different molecular weights;
    (b) condensing said condensible gases, such condensing producing heat of condensation; and
    (c) producing power by means responsive to the heat of said condensation.

11. The method in accordance with claim 10 wherein the minimum cross-sectional dimension of the pores is of the same order of magnitude as the mean free path of the gases moved.

12. The method in accordance with claim 10 wherein:
    (a) the gases contain condensible and non-condensible gases of different molecular weights and heat of condensation; and
    (b) producing heating or cooling by means responsive to said heat of condensation.

13. The method in accordance with claim 12 wherein the minimum cross sectional dimension of the pores is of the same order of magnitude as the mean free path of the gases to be moved.

14. A method for separating fast-moving molecules from slow-moving molecules in a gas comprising:
    (a) providing multiple membranes having pores extending therethrough of a size and shape to utilize the random motion of molecules in a gas to move gas through the membranes predominantly in one direction and with higher pressure on the downstream sides than on the upstream sides;
    (b) arranging the multiple membranes in series with a by-pass around all or most of the membranes to recycle a portion of the gas from the downstream sides to the upstream sides of the membranes; and (c) removing heat from the downstream sides of the membranes or absorbing heat at the upstream sides of the membranes.

15. The method in accordance with claim 14 wherein the minimum cross sectional dimension of the pores is of the same order of magnitude as the mean free path of the molecules moved.

16. The method in accordance with claim 14 and producing power by means responsive to a temperature difference between fast-moving molecules and slow-moving molecules.

17. The method in accordance with claim 16 wherein the minimum cross-sectional dimension of the pores is of the same order of magnitude as the mean free path of the molecules moved.

* * * * *